(12) United States Patent
Hirata et al.

(10) Patent No.: US 9,944,300 B2
(45) Date of Patent: Apr. 17, 2018

(54) RAILCAR WITH END CAP

(71) Applicant: KAWASAKI JUKOGYO KABUSHIKI KAISHA, Hyogo (JP)

(72) Inventors: Hiroyuki Hirata, Kobe (JP); Ryosuke Ashida, Kobe (JP)

(73) Assignee: KAWASAKI IUKOGYO KABUSHIKI KAISHA, Hyogo (JP)

( * ) Notice: Subject to any disclaimer, the term of this patent is extended or adjusted under 35 U.S.C. 154(b) by 181 days.

(21) Appl. No.: 14/979,856

(22) Filed: Dec. 28, 2015

(65) Prior Publication Data

US 2017/0183017 A1 Jun. 29, 2017

(51) Int. Cl.
*B61D 17/00* (2006.01)
*B60S 1/04* (2006.01)

(52) U.S. Cl.
CPC .............. *B61D 17/00* (2013.01); *B60S 1/04* (2013.01)

(58) Field of Classification Search
CPC .......... B61D 17/00; B61S 1/04; B61S 1/0402; B61S 1/0413; B61S 1/0416; B61S 1/043
See application file for complete search history.

(56) References Cited

U.S. PATENT DOCUMENTS

| | | | | | |
|---|---|---|---|---|---|
| 5,722,108 A | * | 3/1998 | Sakyo | ...................... | B60S 1/04 15/250.01 |
| 5,771,526 A | * | 6/1998 | Burton | .................... | B60R 13/04 15/250.001 |
| 5,946,763 A | * | 9/1999 | Egner-Walter | ....... | B60H 3/0658 15/250.02 |
| 5,969,431 A | * | 10/1999 | Miller | ....................... | B60S 1/26 307/10.1 |
| 6,381,799 B1 | * | 5/2002 | Leutsch | .................... | B60S 1/04 15/250.19 |
| 6,505,376 B1 | * | 1/2003 | Kagawa | .................. | B60R 21/34 15/250.3 |
| 6,536,069 B1 | * | 3/2003 | Neag | ......................... | B60S 1/18 15/250.14 |
| 6,854,154 B2 | * | 2/2005 | Masuda | ................ | B60S 1/0488 15/250.3 |
| 2004/0084935 A1 | * | 5/2004 | Johnson | ................ | B60S 1/0419 296/192 |
| 2008/0301898 A1 | * | 12/2008 | Katou | .................... | B60S 1/0402 15/250.201 |
| 2011/0047739 A1 | * | 3/2011 | Kinoshita | ............. | B60S 1/0402 15/250.31 |
| 2013/0069387 A1 | * | 3/2013 | Webb | .................... | B60S 1/0402 296/96.17 |

(Continued)

FOREIGN PATENT DOCUMENTS

JP 63-180455 11/1988

*Primary Examiner* — Jason C Smith
(74) *Attorney, Agent, or Firm* — Studebaker & Brackett PC

(57) ABSTRACT

A railcar according to an embodiment of the present disclosure is a railcar with a plastic end cap covering a front surface of a car body in a front car, the railcar including: a wiper shaft configured to attach a wiper blade to an end portion of the wiper shaft and pass through the car body while extending inside and outside the car body; a penetrated portion formed as part of the car body and configured such that the wiper shaft passes through the penetrated portion; and an opening portion formed in the end cap and exposing at least part of the penetrated portion to a car exterior.

10 Claims, 3 Drawing Sheets

(56) References Cited

U.S. PATENT DOCUMENTS

| | | | |
|---|---|---|---|
| 2013/0284047 A1* | 10/2013 | Petto | B60S 1/3406 105/392.5 |
| 2015/0102626 A1* | 4/2015 | Jozwiak | B60S 1/0488 296/96.15 |
| 2016/0010385 A1* | 1/2016 | Kawashima | E06B 7/28 49/70 |
| 2016/0339876 A1* | 11/2016 | Aramaki | B60S 1/50 |
| 2017/0183017 A1* | 6/2017 | Hirata | B60S 1/04 |

* cited by examiner

RAILCAR WITH END CAP

1. TECHNICAL FIELD

The present disclosure relates to a railcar with an end cap covering a front surface of a car body.

2. BACKGROUND

On a front surface (front end) of a car body in a front car, so as to cover the car body, panel-shaped plastic outer shell end caps (hereinafter, referred to as the "end caps") are sometimes attached as a decoration. It should be noted that the end caps are sometimes called as the "front hoods or front bonnet". The car body is a structural element made by metal, and the end caps are often made of Fiber Reinforced Plastics (FRP). Providing a windshield wiper on a front window of the car body allows a driver to ensure visibility at the time of rainfall or the like. A drive unit for the windshield wiper such as a motor is provided inside the car. One end of a wiper shaft of the windshield wiper is connected to the drive unit and the other end is connected to a wiper blade (made by rubber) outside the car. Also, the wiper shaft rotatably passes through the front surface to drive the wiper blade. A through hole section of the wiper shaft in the front surface is required to have a waterproof structure.

SUMMARY

Meanwhile, the end caps are sometimes formed to cover the front surface of the car body except for the window portion. In this case, there is a need to attach the wiper shafts after the end caps are attached to the car body. Thus, both sections of the car body and the end cap through which the wiper shaft passes are required to have the waterproof structure. In particular, the section of the wiper shaft passing through the end cap is required to have a high waterproof performance because the end cap is exposed to a car exterior.

In a watertight test for the waterproof structure, checking the quality of the watertight is carried out by spraying shower to the waterproof structure. Firstly, in order to check the quality of water-tightness of the structural element, the watertight test is performed with respect to the car body before the end caps are attached to the car body. After that, in order to check the quality of water-tightness of the wiper shaft, it is necessary to perform a further watertight test in a state where the end caps and the wiper shaft are attached to the car body. However, this adds to a working time and cost in a manufacturing process.

So, an object of the present disclosure is to provide a railcar with an end cap, which can reduce the working time and cost for the watertight test with respect to the wiper shaft in comparison with the conventional manner.

In order to achieve the object, a railcar in one aspect of the present disclosure is a railcar with a plastic end cap covering a front surface of a car body in a front car, and the railcar is configured to comprise: a wiper shaft configured to attach a wiper blade to an end portion of the wiper shaft, and pass through the car body while extending inside and outside the car body; a penetrated portion formed as part of the car body, and configured such that the wiper shaft passes through the penetrated portion; and an opening portion formed in the end cap, and exposing at least part of the penetrated portion to a car exterior.

According to the above configuration, the penetrated portion through which the wiper shaft passes is provided on the car body, and the end cap has the opening portion through which the penetrated portion is exposed to the car exterior. Therefore, the wiper shaft does not pass through the end cap. By virtue of the railcar of the present aspect with the above configuration, it is no longer necessary for performing a watertight test with respect to the wiper shaft after the end cap is attached to the car body. Therefore, this structure reduces the working time and the cost required for the watertight test with respect to the wiper shaft in comparison with the conventional manner.

DETAILED DESCRIPTION OF THE PREFERRED EMBODIMENTS

A railcar serving as an embodiment will be described below with reference to the drawings. It should be noted that in the figures, the same or similar constituent parts will be given the same reference signs. In order to avoid unnecessary wordiness in the following description and to facilitate understanding of those skilled in the art, detailed description of the already-well-known matters and repetitive description for the substantially identical configurations may sometimes be omitted. Contents of the following description and the attached drawings do not intend to limit the scope described in the claims.

Figure 1:
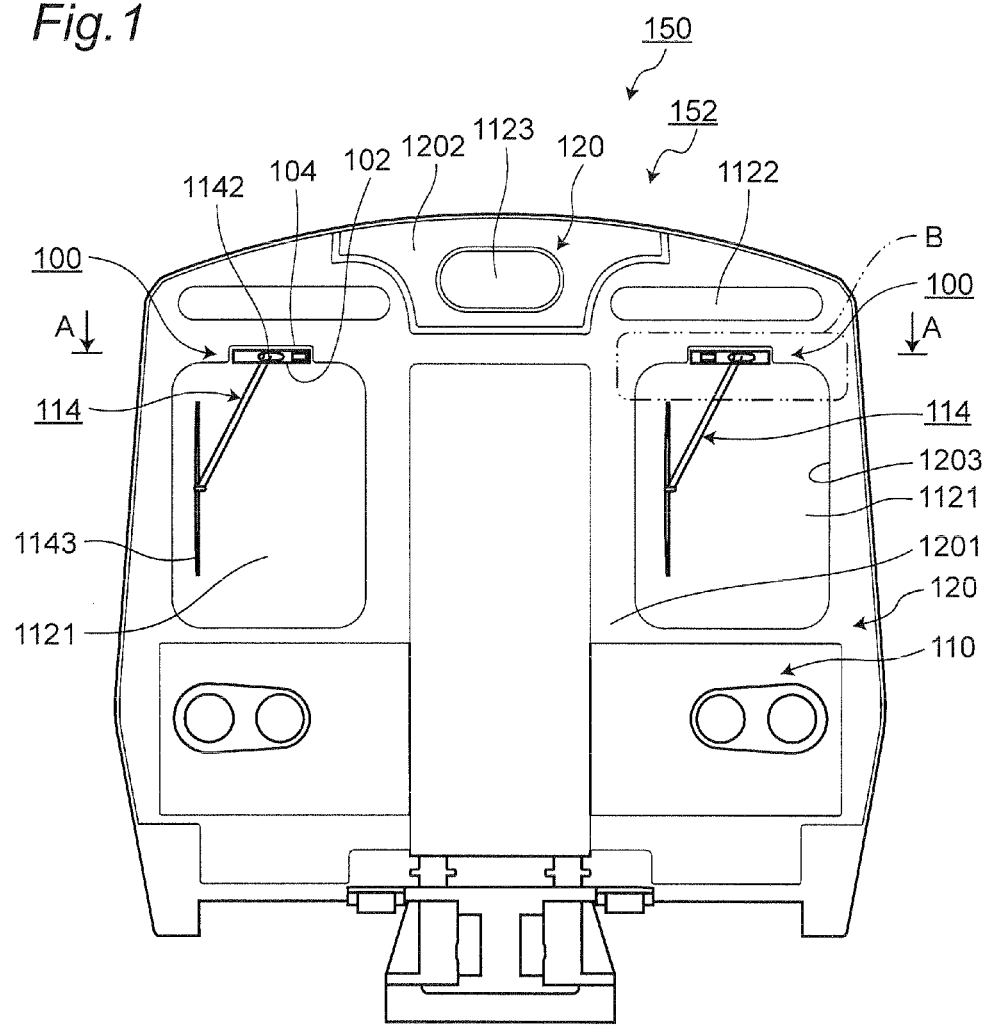
FIG. 1 is a front view showing a front surface part of a front car of a railcar with an end cap in an embodiment.
Figure 2:
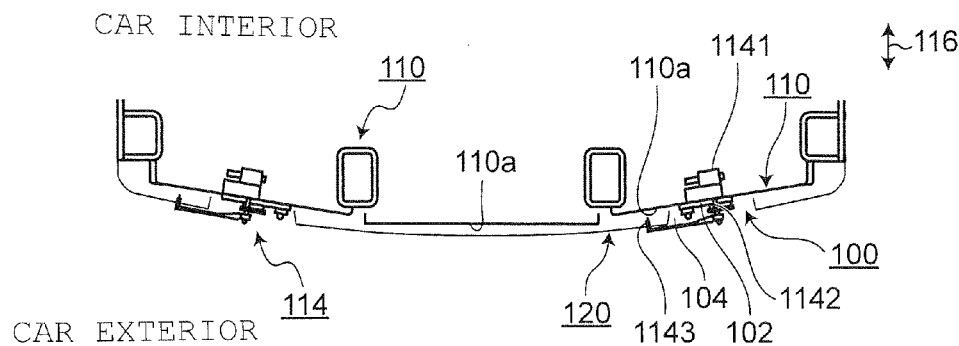
FIG. 2 is a cross-sectional view taken along part A-A shown in FIG. 1.

FIG. 1 shows a front surface part 152 of a front car in a railcar 150 of the present embodiment. The front surface part 152 has cab windows 1121, and windshield wipers 114 are disposed on the cab windows 1121. As shown in FIG. 2, each of the windshield wipers 114 has a drive unit 1141 with a motor, etc. arranged inside the car, a wiper shaft 1142, and a rubber wiper blade 1143 disposed at an end portion of the wiper shaft 1142 outside the car and wiping the cab window 1121. The wiper shaft 1142 passes through a car body 110 to extend between inside and outside the car, and connects the drive unit 1141 and the wiper blade 1143.

As shown in FIG. 2, a panel-shaped end cap 120 is mounted on the front surface part 152 of the railcar 150 so as to cover an outer surface 110a of the car body 110 manufactured by steel members. As shown in FIG. 1, the end cap 120 is formed by a plurality of molded members 1201 and 1202. It should be noted that the molded member 1201 does not cover for example the cab windows 1121, a destination display portion 1122 and the like, and the molded member 1202 does not cover a headlight portion 1123. Namely, the molded members 1201 and 1202 have openings corresponding to respective shapes of the cab windows 1121 and the like. For example, the molded member 1201 has window opening portions 1203 corresponding to the cab windows 1121.

Constituent parts of a penetration structure 100 for the wiper shaft 1142 will be described below in turns.

As described above, the wiper shaft 1142 is a shaft forming the windshield wiper 114 and connecting the drive unit 1141 and the wiper blade 1143, and is rotated by the drive unit 1141.

Figure 3:
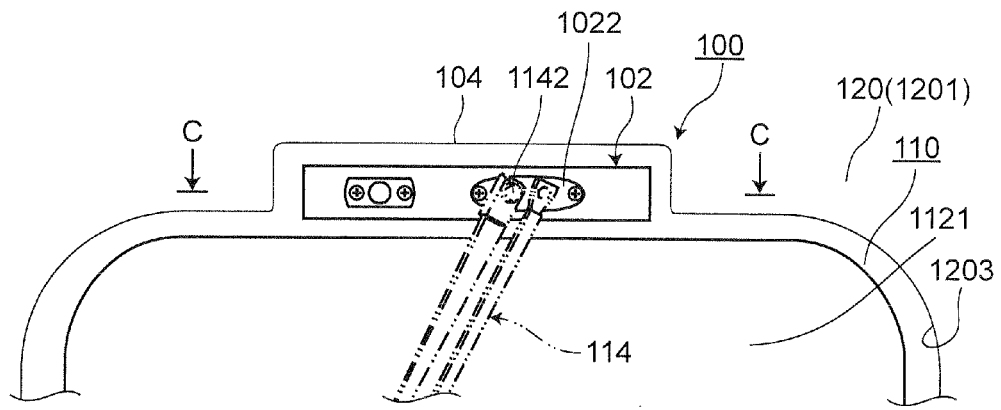
FIG. 3 is an enlarged view of part B shown in FIG. 1.
Figure 4:
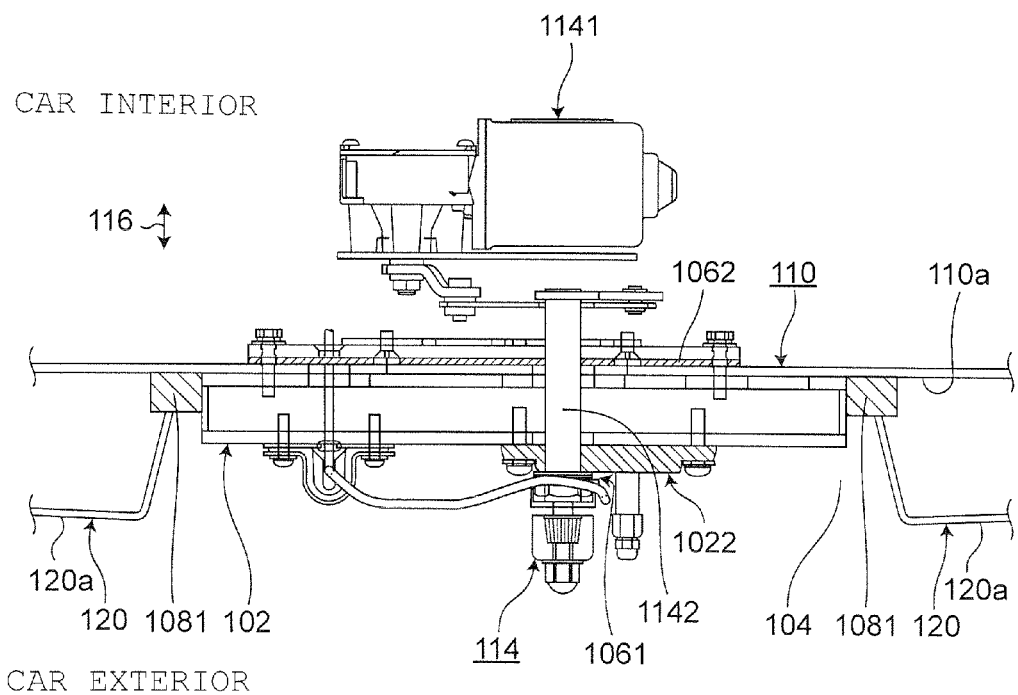
FIG. 4 is a cross-sectional view taken along part C-C shown in FIG. 3.

Penetrated portions 102 are part of the car body 110 positioned immediately above the cab windows 1121. As shown in FIGS. 3 and 4, each of the penetrated portions 102 is for example a box-shaped, and includes a part through which the wiper shaft 1142 passes and for example a cleaning liquid supply portion and the like. This penetrated portion 102 has a through hole through which the wiper shaft 1142 rotatably passes, and has a first waterproof member serving as a waterproof structure between the penetrated portion 102 and the wiper shaft 1142.

As shown in FIG. 4, an outside seal member 1061 disposed on the car exterior side of the penetrated portion 102 and an inside seal member 1062 disposed on the car interior side correspond to the first waterproof member.

The penetrated portion 102 protrudes to the car exterior side in response to each of opening portions 104 of the end cap 120. In a front view of the railcar 150, an area of the opening portion 104 (frontal projected area of the opening portion 104) is larger than an area of the penetrated portion 102 (frontal projected area of the penetrated portion 102). Thereby, this structure provides an effective positioning of the penetrated portion 102 with respect to the opening portion 104 even in a case where manufacturing precision in each of the car body 110 and the end cap 120 is not high. It should be noted that a second waterproof member to be described later is provided in a clearance between the opening portion 104 and the penetrated portion 102.

It should be noted that FIGS. 3 and 4 show the right penetrated portion 102 and around it, through which the wiper shaft 1142 of the windshield wiper 114 shown on the right side in FIGS. 1 and 2 passes. A similar structure is provided for the left penetrated portion 102 and around it.

The opening portion 104 is formed on the end cap 120 and is a portion through which at least part of the penetrated portion 102 is exposed to the car exterior side. In the present embodiment, as shown in FIGS. 1 and 3, the opening portion 104 is formed in response to the penetrated portion 102, and corresponds to a cut-away portion formed by cutting part of the window opening portion 1203. In such a way, as clear from FIG. 3, the opening portion 104 is formed in the end cap 120 (the molded member 1201) in such a manner that the entire penetrated portion 102 is exposed to the car exterior side by the opening portion. Therefore, it does not form a structure that the wiper shaft 1142 passes through the end cap 120.

As shown in FIG. 4, a packing 1081 corresponding to one example of the second waterproof member is provided in a gap between the outer surface 110a of the car body 110 and the end cap 120 in a peripheral part of the end cap 120. The second waterproof member enhances a sealing capability and a vibration proofing property of the end cap 120 with respect to the outer surface 110a of the car body 110, and substantially prevents an interior of the end cap 120 from being visible through the opening portion 104. It should be noted that the packing 1081 is a multipurpose black rubber member. Making the end cap 120 black minimizes a visible impact between the end cap and the packing 1081.

As described above, by virtue of the railcar 150 having the penetration structure 100 for the wiper shaft 1142 in the present embodiment, the member through which the wiper shaft 1142 passes is only the penetrated portion 102 provided on the car body 110. Consequently, a watertight test with respect to a through hole section of the wiper shaft 1142 (corresponding to the following wiper shaft attachment part 1022 (in FIGS. 3 and 4)) is only required to be performed once with respect to the penetrated portion 102 provided on the car body 110, which is one time less than the conventional manner. Thus, the structure of the present embodiment can reduce a working time and cost for the test in a manufacturing process.

Further, in the present embodiment, by virtue of the railcar 150 having the penetration structure 100 for the wiper shaft 1142 in the present embodiment, the following effect can also be obtained.

That is, the end cap 120 is sometimes damaged by collision of a physical object or the like against the front surface part 152, and replaced. In the conventional structure, the waterproofing and the watertight test with respect to the though hole section of the wiper shaft in the end cap need to be performed after the replacement of the end cap.

On the other hand, by virtue of the railcar 150 of the present embodiment, the end cap 120 has no through hole section of the wiper shaft 1142. Thus, the waterproofing and the watertight test need not be performed if the end cap 120 is replaced.

As seen above, not only at the time of manufacturing the railcar 150 but also after the operation of the railcar 150, it is possible to reduce the working time and the cost, and enhance a maintainability.

In the railcar 150 of the present embodiment, the opening portion 104 in the end cap 120 is formed by cutting part of an upper side in the window opening portion 1203, and then the entire of the penetrated portion 102 is exposed to the car exterior through the opening portion.

Figure 5A:
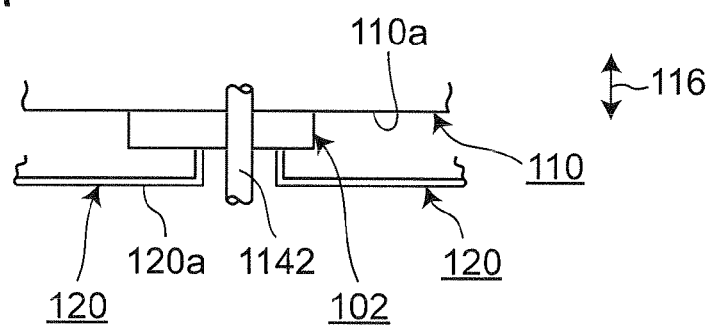
FIGS. 5A to 5C are views showing modified examples of a positional relationship between a penetrated portion and the end cap.

However, the opening portion 104 is not limited to the configuration in which the entire of the penetrated portion 102 is exposed to the car exterior through the opening portion, but as shown in FIG. 5A, at least the wiper shaft attachment part 1022 (in FIGS. 3 and 4) in the penetrated portion 102 may be exposed to the car exterior through the opening portion. The above at least the wiper shaft attachment part 1022 corresponds to the through hole section of the wiper shaft 1142. It should be noted that the outside seal member 1061 of the first waterproof member is included in the wiper shaft attachment part 1022.

Figure 5B:
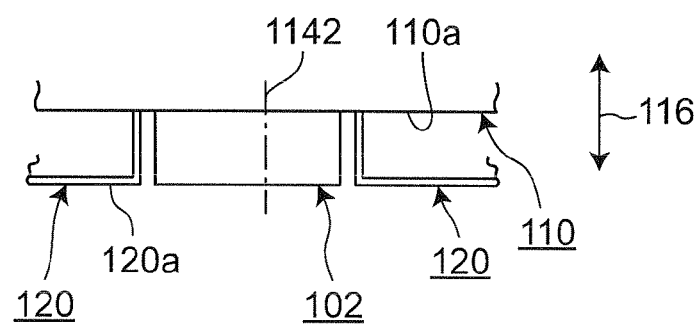
Figure 5C:
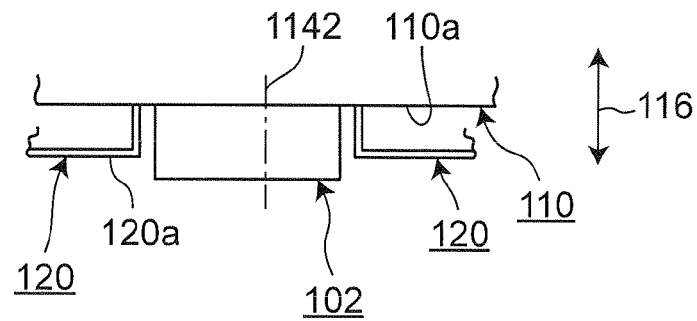

In the present embodiment, as shown in FIG. 4, the penetrated portion 102 is a recessed portion such that the penetrated portion 102 is positioned toward the car interior side with respect to an outer surface 120a of the end cap 120 in the car longitudinal direction 116. However, as shown in FIGS. 5B and 5C, the penetrated portion 102 may be positioned flush with or protrude over the outer surface 120a of the end cap 120.

Further, in one aspect, the railcar of the present embodiment is a railcar with a plastic end cap covering a front surface of a car body in a front car, and the railcar may be configured to comprise: a wiper shaft configured to attach a wiper blade to an end portion of the wiper shaft and pass through the car body while extending inside and outside the car body; a penetrated portion formed as part of the car body and configured such that the wiper shaft passes through the penetrated portion; and an opening portion formed in the end cap and exposing at least part of the penetrated portion to a car exterior. Further, the railcar may adopt following configurations.

The railcar may further comprise a first waterproof member arranged between the penetrated portion and the wiper shaft.

The railcar may further comprise a second waterproof member arranged between the penetrated portion and the end cap.

The penetrated portion of the railcar may be formed in a convex shape protruding toward the car exterior in response to the opening portion in the end cap.

The end cap of the railcar may further include a window opening portion, and the opening portion of the railcar may be a cut-away portion formed by cutting part of the window opening portion.

A frontal projected area of the opening portion in the end cap of the railcar may be larger than a frontal projected area of the penetrated portion in a front view of the railcar.

The present disclosure sufficiently describes the preferred embodiment with reference to the attached drawings. However, various modifications and corrections are obvious for those skilled in this art. It should be understood that such modifications and corrections are included in the scope of the present invention unless the modifications and corrections are out of the scope specified by the attached claims.

The invention claimed is:

1. A railcar with a plastic end cap covering a front surface of a car body in a front car, the railcar comprising:
   a wiper shaft attached a wiper blade to an end portion of the wiper shaft, and passed through the car body while extending inside and outside the car body;
   a penetrated portion formed as part of the car body, and wherein the wiper shaft passes through the penetrated portion; and
   an opening portion formed in the end cap, and exposing at least part of the penetrated portion to a car exterior,
   wherein the end cap further includes a window opening portion such that the end cap surrounds a window of the railcar.

2. The railcar according to claim 1, further comprising:
   a first waterproof member arranged between the penetrated portion and the wiper shaft.

3. The railcar according to claim 1, further comprising:
   a second waterproof member arranged between the penetrated portion and the end cap.

4. The railcar according to claim 1, wherein the penetrated portion is formed in a convex shape protruding toward the car exterior in response to the opening portion in the end cap.

5. The railcar according to claim 1, wherein
   the opening portion is a cut-away portion formed by cutting part of the window opening portion.

6. The railcar according to claim 1, wherein
   a frontal projected area of the opening portion in the end cap is larger than a frontal projected area of the penetrated portion in a front view of the railcar.

7. A railcar with a plastic end cap covering a front surface of a car body in a front car, the railcar comprising:
   a wiper shaft attached a wiper blade to an end portion of the wiper shaft, and passed through the car body while extending inside and outside the car body;
   a penetrated portion formed as part of the car body, and wherein the wiper shaft passes through the penetrated portion;
   an opening portion formed in the end cap, and exposing at least part of the penetrated portion to a car exterior;
   a first waterproof member arranged between the penetrated portion and the wiper shaft; and
   a second waterproof member arranged between the penetrated portion and the end cap.

8. The railcar according to claim 7, wherein the penetrated portion is formed in a convex shape protruding toward the car exterior in response to the opening portion in the end cap.

9. The railcar according to claim 7, wherein
   the end cap further includes a window opening portion, and
   the opening portion is a cut-away portion formed by cutting part of the window opening portion.

10. The railcar according to claim 7, wherein
    a frontal projected area of the opening portion in the end cap is larger than a frontal projected area of the penetrated portion in a front view of the railcar.

* * * * *

UNITED STATES PATENT AND TRADEMARK OFFICE
CERTIFICATE OF CORRECTION

PATENT NO. : 9,944,300 B2  
APPLICATION NO. : 14/979856  
DATED : April 17, 2018  
INVENTOR(S) : Hirata et al.

Page 1 of 1

It is certified that error appears in the above-identified patent and that said Letters Patent is hereby corrected as shown below:

On the Title Page

The Assignee Name (73) should be changed from "KAWASAKI IUKOGYO KABUSHIKI KAISHA" to --KAWASAKI JUKOGYO KABUSHIKI KAISHA--

Signed and Sealed this  
Tenth Day of July, 2018

Andrei Iancu  
*Director of the United States Patent and Trademark Office*